United States Patent
Slater

(10) Patent No.: US 6,386,210 B1
(45) Date of Patent: May 14, 2002

(54) COSMETIC DEVICE IN A SHAPE OF A TELEPHONE HANDSET

(75) Inventor: Tania Slater, Ullenhall (GB)

(73) Assignee: Midland Cosmetics Sales plc (GB)

( * ) Notice: Subject to any disclaimer, the term of this patent is extended or adjusted under 35 U.S.C. 154(b) by 0 days.

(21) Appl. No.: 09/859,050

(22) Filed: May 16, 2001

(30) Foreign Application Priority Data

Feb. 2, 2001 (GB) .............................................. 2099188
Feb. 5, 2001 (GB) .............................................. 0102701

(51) Int. Cl.⁷ .......................... A45D 33/24; A45D 33/28
(52) U.S. Cl. ....................................... 132/294; 132/297
(58) Field of Search ............................... 132/294, 297, 132/296, 295, 314, 317, 293; 446/71, 75, 76, 141, 142; D28/79, 87; D21/517; D14/143; D9/307; D3/271

(56) References Cited

U.S. PATENT DOCUMENTS 4,237,650 A * 12/1980 Goldfarb ...................... 46/175
D287,865 S * 1/1987 Colnaghi .................... D21/111
D371,127 S * 6/1996 Baab ......................... D14/143
5,681,200 A * 10/1997 Shecter ........................ 446/76
D423,016 S * 4/2000 Fletcher ..................... D14/250

* cited by examiner

Primary Examiner—John J. Wilson
Assistant Examiner—Robyn Kieu Doan
(74) Attorney, Agent, or Firm—Bracewell & Patterson, LLP

(57) ABSTRACT

The present invention relates to a carrier for a plurality of cosmetics, which carrier comprises a generally rectangular body member shaped in the form of a mobile telephone handset having two opposed axially extending major faces, two axially extending minor side faces and two transversely extending minor terminal faces and an aerial extending axially from or adjacent one of the minor terminal faces, characterised in that a. one of the major faces is provided with a plurality of recesses which mimic the push buttons of the handset, which recesses contain a solid or semi-sold cosmetic; and b. the aerial is provided by an axially extending applicator having an operative terminal portion for transferring cosmetic from a recess to the skin of a user; and c. a cover member is provided which removeably covers the recesses so as to protect the cosmetics therein during transport and storage prior to use.

11 Claims, 2 Drawing Sheets

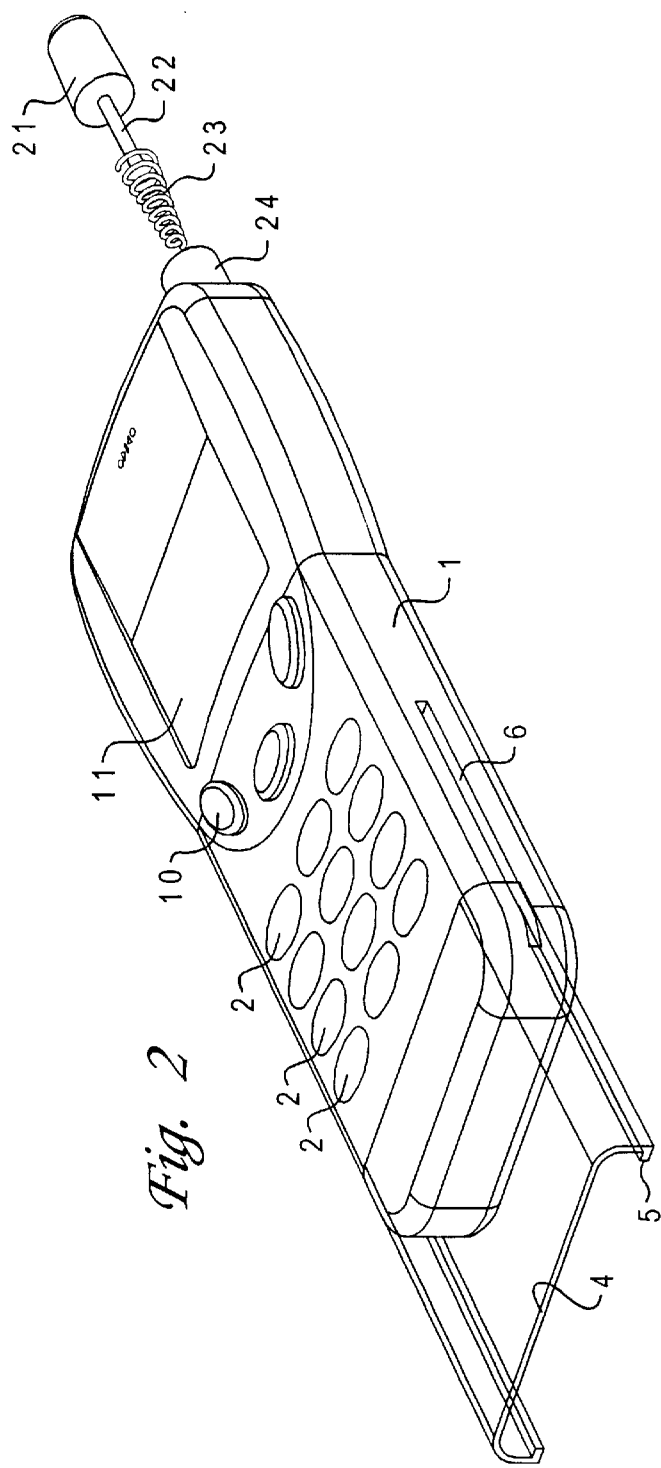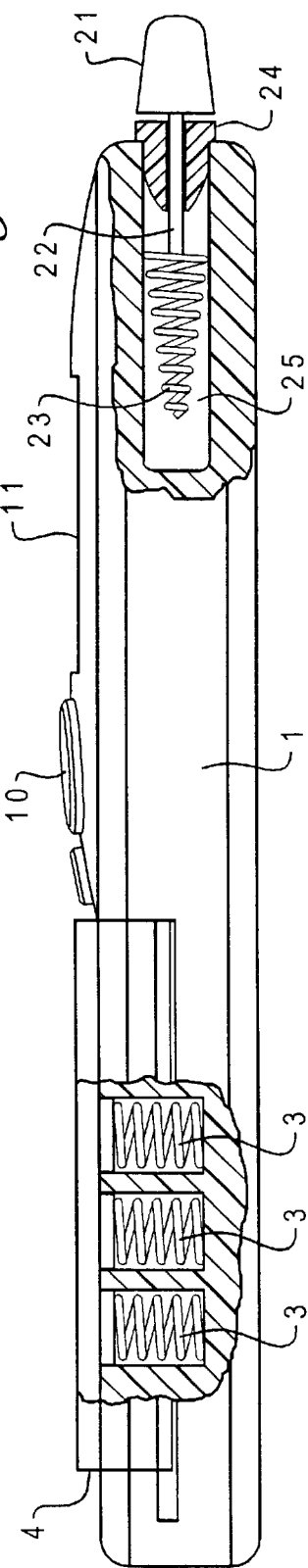

COSMETIC DEVICE IN A SHAPE OF A TELEPHONE HANDSET

The present invention relates to a device, notably to a carrier for cosmetic compositions.

BACKGROUND TO THE INVENTION

Many forms of cosmetic composition are put up in a solid formulation for application to the skin of the user with a brush or pad. Such compositions include lipsticks, eye shadowers or liners, face powders or blushers, and the term solid composition is used herein to denote in general compacted powders, for example in cake or pellet form, and lipsticks, perfumes and other compositions which are put up in stick or other self-supporting gelled or solid or semi-solid forms.

Such compositions are typically put up in a compact or other carrier housing which are normally in the closed state for transport and storage, for example in the handbag of the user. When the user wishes to apply the composition, the user opens the container to expose a surface of the composition in the container. The user then applies to composition to the skin, for example the lips, eyelids or cheeks, by using a brush, pad or other applicator to transfer some of the composition from the exposed surface to the desired locus on the skin. Such a method for storing and using cosmetic compositions usually requires the use of separate containers and applicators for each cosmetic composition. As a result, a user must often carry a plurality of such containers, which can be inconvenient and bulky. Alternatively, the user has to select which cosmetic is required in the forthcoming period and to discard those not selected. This carries the risk that one of the discarded compositions will in fact be required and is not available to the user.

We have devised a form of carrier, which is capable of carrying a plurality of cosmetic compositions, and yet which is compact and discrete for the user to carry in a handbag or pocket.

SUMMARY OF THE INVENTION

Accordingly, the invention provides a carrier for a plurality of cosmetics, which carrier comprises a generally rectangular body member shaped in the form of a mobile telephone handset having two opposed axially extending major faces, two axially extending minor side faces and two transversely extending minor terminal faces and an aerial extending axially from or adjacent one of the minor terminal faces, characterised in that:

a. the body member has a plurality of recesses in one major face thereof which recesses mimic the shape and location of the buttons notionally required to operate the handset, at least some of the said recesses each containing or being adapted to receive a cosmetic composition to be applied to the skin of a user;

b. a cover member is provided which is moveable from a first position at which it overlies the recesses to a second position at which the surface of the composition in at least some of the recesses is exposed; and c. an applicator for applying cosmetic composition from the exposed face of the composition to the skin of a. user, which applicator. comprises an axially extending member adapted to be removeably received by an applicator recess in the body member extending from at or adjacent the minor face of the body member carrying the aerial, the applicator having a terminal portion which mimics the tip of the aerial when the applicator is inserted into the applicator recess in the body member.

The use of such a shape of carrier for the cosmetic compositions provides a simple and compact carrier which can carry a plurality, typically 9 to 15, of different cosmetic compositions so that a user can have access to a wide range of cosmetics without the need to carry a large number of separate containers. Since the carrier is in the form of an article which many people carry with them, the carrier is not obtrusive and can be used discretely by the user. Since the applicator is housed within the carrier body member, the user does not have to carry a plurality of applicators and the risk of inadvertent transfer to cosmetic composition from the exposed tip of the applicator during storage is reduced. Since the carrier body is provided with a removable cover member, the risk of accidental leakage or transfer of the cosmetic compositions to other contents in a handbag or the like is reduced and the cover reduces drying out of the compositions within the recesses during storage.

The mobile telephone, which the carrier of the invention mimics, can be of a wide range of forms and sizes. The body member will be of a generally rectangular form with the "buttons" notionally required to operate the telephone located in a grid pattern on one of the major faces of the body. However, the "buttons" can be laid out in any other suitable pattern. If desired, there may be one or more dummy "buttons" which are decorative and serve to enhance the mimicking effect of the shape of the body member. If desired the body member can be provided with a dummy display screen or other features found on a mobile telephone handset. For convenience, the invention will be described hereinafter in terms of a body member carrying 9 "button" recesses to receive the cosmetic compositions lain out in a 3×3 grid with other dummy buttons and a display screen adjacent the aerial end of the body member.

The "button" recesses can be of any suitable shape and size. However, the recesses typically have a capacity of from 0.5 to 2 cls so as to provide an adequate supply of cosmetic therein for the user over a period of days or weeks. Typically, the recesses will have a circular or oval cross-section and a depth of from 0.5 to 1.5 cms. The optimum size and shape of the recesses can be selected within a wide range having regard to the specific cosmetic: composition which that recess is to receive.

When filled with cosmetic compositions, it will usually be desired that each of the "button" recesses contains a unique composition. However, some of the "button" recesses may be deliberately left empty for use in mixing one or more compositions from other recesses, for example to convert a powder composition to a paste or slurry by the addition of water or a perfume oil by the user. For convenience the invention will be described hereinafter in terms of a body member in which all the "button" recesses are filled with different cosmetic compositions.

As indicated above, the cosmetic compositions in the "button" recesses are in solid or semi-solid form so that they do not readily escape from the recesses during handling, transport or storage of the body member once charged with its cosmetic load. The cosmetics can be in, the form or cast or pressed powder blocks or in the form of semi-solid gels such as gelled perfume compositions or lip stick formulations. Such compositions are of conventional nature and commercially available compositions may be used in the present invention with little or no modification and filled into the "button" recesses using conventional filling techniques and equipment. If desired, a range of cosmetic compositions can be provided in individual plugs or pellets from which the user selects those required and inserts them as a drop or push fit into the appropriate "button" recesses.

If desired, the cosmetic compositions can be put up in a secondary cup or other container which is a loose fit within the recesses so that the user may select which cosmetic compositions are to be inserted into the recesses from a wide range of compositions provided in such secondary containers. The user can thus charge the carrier with different range of cosmetics according to the expected conditions under which the cosmetics will be used or according to the personal preference of the user for the identity of the cosmetic to be used. The secondary containers can be a simple push fit into the appropriate "button" recesses or can be secured in the recesses by any other suitable mechanism, for example a screw fit. If desired, the secondary containers can be provided as a tray like member carrying a plurality of cups formed therein which register with the "button" recesses in the body member so that the cosmetic compositions can readily be interchanged, for example from an outdoor range to an evening range simply by exchanging the trays.

The body member is provided with a cover member which moves from a position at which it overlies and protects the cosmetic compositions within the "button" recess, but can be moved to a second position at which the top surface of the plug or pellet of cosmetic within the recess is exposed. The cover member can take any suitable form, depending upon the design of telephone handset being mimicked. For example, the cover can be an opaque one so that the colour and nature of the cosmetic compositions in the "button" recesses cannot be seen until the cover is moved to the second position. Alternatively, the cover may be partially or wholly clear or translucent so that the cosmetic compositions in the "button" recesses are visible through the cover.

The cover can be moved between its two positions by any suitable mechanism. For example, the cover may slide axially to expose the surfaces of the cosmetic compositions. Alternatively, the cover may be hinged at or adjacent the end of the body so that the cover mimics a "flip" opening telephone. The nature of the opening mechanism is dependent upon the design of handset it is desired to mimic and can be selected by the designer of the body member.

The cover serves to protect the cosmetic compositions against contamination by dirt or dust or other materials during storage and handling of the body member prior to or subsequent to use of the device by the user. The cover also reduces the risk of leakage of the contents of the "button" recesses into the handbag or the like of the user. If desired, the cover can be provided with flexible sealing lips or ribs which register with the individual "button" recesses or encircle the general area of the body member carrying the "button " recesses to provide a more fluid or air tight seals to the recesses. For example, the peripheries of the recesses can be provided with upstanding rubber or similar ridges which engage with the underside of the cover member when it is in the closed position.

The body member is provided with an applicator which is inserted into a recess in the body member so as to mimic the aerial of the handset and provide the means by which a user transfers cosmetic from a "button" recess to the skin. Such an applicator typically comprises a terminal portion which mimics the tip of the handset aerial and an axially extending shank which forms or carries a terminal brush or pad or carries a spiral brush or other mechanism which can pick up the cosmetic composition when applied to the exposed surface of the cosmetic composition in the appropriate "button" recess. The form of such applicator can be selected from a wide range of designs according to the nature of the cosmetic composition to be applied to the user's skin. If desired, the terminal "aerial tip" portion of the applicator can be removable so as to expose an alternative form of applicator tip. For example, the applicator can be formed with a brush at one end of the shank and a spiral at the other. A seating collar or annular rib onto which a hollow cup-like cap member can be a push or other fit is located intermediate the terminal portions of the shank. The cap member has an external shape which mimics the desired aerial tip shape.

The shank and the operative terminal portion of the applicator member are received within a recess in the body member so that the exposed terminal portion of the applicator member mimics the aerial or the hand set. Typically, the recess for the shank and operative portion of the applicator extends axially into the body member from the minor face of the body member. However, the location and orientation of the recess can be in other positions depending upon the design of the handset which is being mimicked. If desired, the recess can be provided with cleaning lips or ribs so that cosmetic composition retained upon the tip of the applicator can be removed as the operative portion of the applicator is inserted into or removed from the recess. For example, the recess may be provided with a sponge-like internal collar which wipes the applicator tip. If desired, the collar can be removable so that it can be washed between uses and can be impregnated with water or other wash liquor to assist cleaning of the applicator.

The body member can be provided with other features to enhance its utility. For example, the display screen usually found on a mobile telephone handset can be mimicked with a portion of mirror glass or polished metal to provide a mirror for the user, one or more of the "buttons" not used to provide recesses for the cosmetic compositions can be formed as a pull out button carrying a pad to provide an alternative form of applicator to that used to mimic the aerial. The cover can be formed with a dished surface to act as a dish within which two or more of the individual cosmetics from the "button" recesses can be mixed or blended, for example to achieve a desired colour tone from two different coloured face powders.

The body member and its associated components can be made from any suitable material using conventional moulding, machining or other manufacturing techniques. For example, the body of the carrier can be formed by injection moulding and the accessories formed by moulding or machining any suitable material, for example a plastic, as separate components which are a push, screw, snap or other fit upon the carrier body.

The invention has been described above in terms of a boded member which mimics a mobile telephone handset. However, it will be appreciated that the body member need not be a copy of an existing design but may be an original design which resembles a handset without being a copy of a specific design. The term mimics is therefore used to denote a body member which incorporates the general visual features of telephone handsets in general. Furthermore, it will be appreciated that the hand set need not strictly be a mobile telephone hand set, but could be based upon the features of other forms of telecommunications hand sets which incorporate dialling buttons and have an aerial extending from the body of the hand set.

DESCRIPTION OF THE DRAWINGS

A preferred embodiment of the device of the invention will now be described by way of illustration only with respect to the accompanying drawings in which FIG. 2 shows the device of FIG. 2 with the cover in the closed position; and FIG. 3 is a vertical longitudinal cross section through the device along the line AA'.

DESCRIPTION OF THE PREFERRED EMBODIMENT

Figure 1:
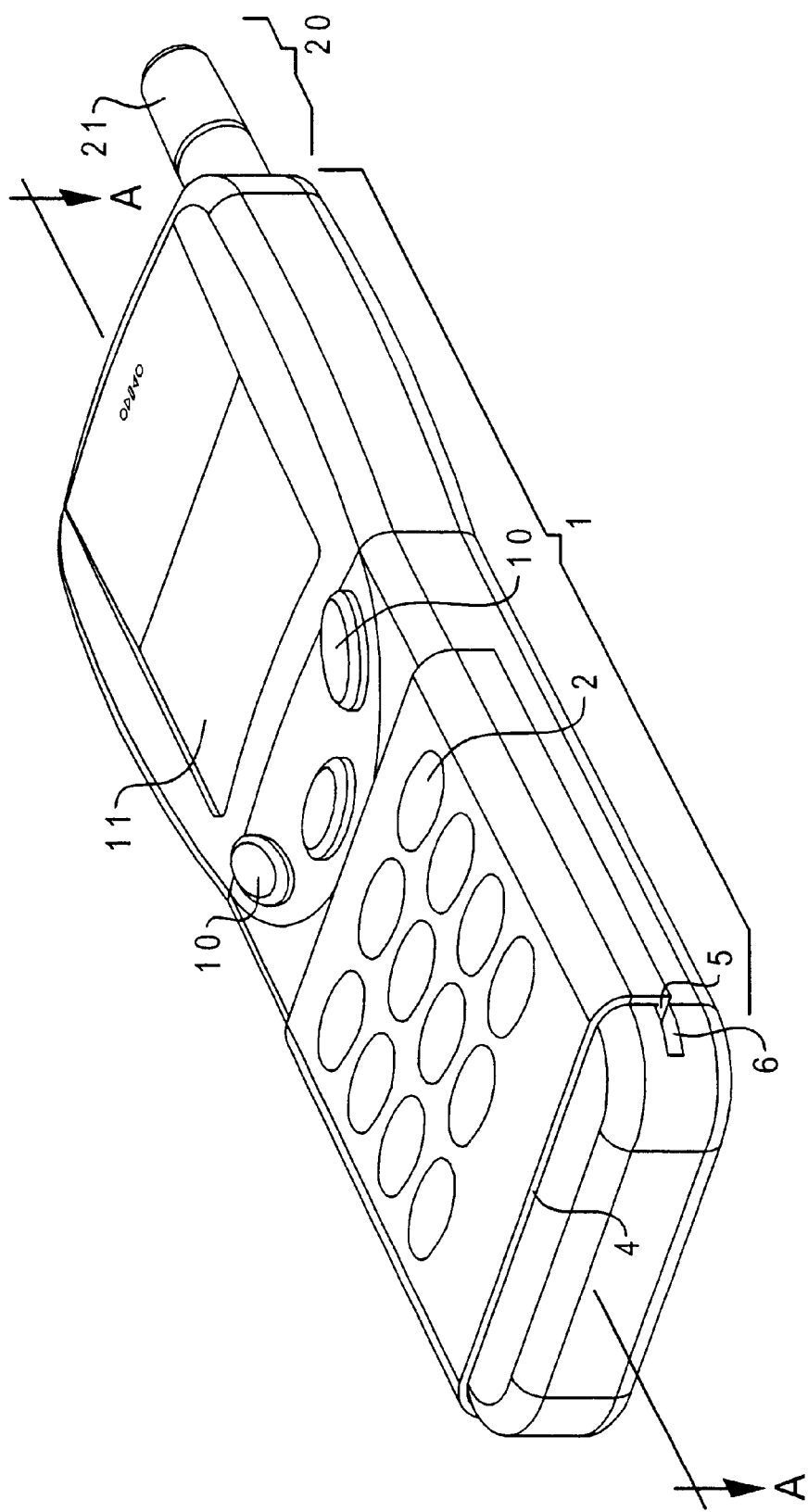
FIG. 1 is a perspective view of the device with the cover member in its open position to expose the surface of cosmetic compositions in the "button" recesses.

The device comprises a body member 1 which is generally rectangular in shape and mimics the handset of a mobile telephone. Body member 1 has formed in part of one of the major axial faces of the body, in this case the top face as shown in FIG. 1, a 3×3 grid of oval cross-section recesses 2 located where the operating buttons of the handset would be found on a real handset. These recesses are about 1 cm deep and each contain a plug or pellet 3 of a cosmetic composition as shown in FIG. 3. The body 1 is also provided with a clear plastic cover plate 4 which has inwardly directed axial ribs 5 which engage in axial grooves 6 in the axial side faces of member 1. The cover 4 can be slid from its closed position shown in FIG. 1 at which it overlies the recesses 2, to its open position as shown in FIG. 2 at which the open tops of the recesses 2 are exposed.

The top face of member 1 can be provided with other features, for example further operating "buttons" 10, a mirror 11 to mimic the display screen of the handset. The body member 1 need not be a right rectangular shape, but could have a bulbous or tapered terminal portion as shown in FIG. 1 to provide additional visual features.

The upper minor transverse end face of body 1 is provided with a dummy aerial 20. This comprises an aerial tip member 21 attached to an axial shank 22 carrying a spiral brush or other applicator operative end portion 23. The portion 24 of the dummy aerial extending from the body member 1 forms the mouth to a recess 25 which extends axially into the body 1. This recess 25 receives the shank 22 and the brush 23 so that the tip member 21 seats upon portion 24 to mimic the aerial of the handset when the brush is fully inserted into recess 25.

As shown in FIG. 2, each of the recesses is filled wholly or partially with a cosmetic composition 3 which can be a solid compacted or pelleted powder or a semi-solid such as a lipstick.

The device is supplied initially with the recesses filled with the desired cosmetic compositions so as to provide a user with a range of the usually used cosmetics. If desired the open tops of the filled recesses 2 can be provided with a tear off or peel back metal or plastic. foil seal to protect the compositions 3 within the recesses 2 during transport and storage prior to first use by a purchaser. The user moves the cover 4 axially to its open position as shown in FIG. 2. This exposes the top surfaces of the cosmetic 3 in the recesses 2. In place of linear movement, the cover 4 can be pivoted to swing into open position.

The user pulls the tip 21 of the applicator to draw the shank 22 and brush 23 out of the axial recess 25 and applies the tip of the brush 23 to the exposed face of the cosmetic 3. This transfers some of the cosmetic to the brush, which can then be used to apply the cosmetic to the face or other skin area of the user. If desired one or more of the extra "buttons" 10 can be removeably mounted to the face of member 1 and can carry a pad which can be used to apply powder from a cake 3 in a recess 2.

What is claimed is:

1. A carrier for a plurality of cosmetics, which carrier comprises a generally rectangular body member shaped in the form of a telephone handset having two opposed axially extending major faces, two axially extending minor side faces and two transversely extending minor terminal faces and an aerial extending axially with respect to one of the minor terminal faces, characterised in that:
    a. the body member has a plurality of recesses in one major face thereof which recesses mimic the shape and location of the buttons notionally required to operate the handset, at least some of the said recesses each being adapted to receive a cosmetic composition to be applied to the skin of a user;
    b. a cover member is provided which is moveable from a first position at which it overlies the recesses to a second position at which the surface of the composition in at least some of the recesses is exposed; and
    c. an applicator is provided having an operative terminal portion for transferring a cosmetic composition from the exposed face of the composition in a recess to the skin of a user, which applicator comprises an axially extending member carrying the operative terminal portion and adapted to be removeably received by an applicator recess in the body member extending axially with respect to the minor face of the body member carrying the aerial, the applicator having a second terminal portion which mimics the tip of the aerial when the applicator is inserted into the applicator recess in the body member.

2. A carrier as claimed in claim 1, wherein the recesses in the body member contain a cosmetic in solid form.

3. A carrier as claimed in claim 2, wherein the cosmetic in at least one of the recesses is put up in a secondary container which is a removeable fit into the recess.

4. A carrier as claimed in claim 1, wherein the cover member pivots between said first and second positions.

5. A carrier as claimed in claim 1, wherein the cover member is a sealing fit upon the said recesses.

6. A carrier as claimed in claim 5, wherein at least some of the recesses are provided with upstanding annular sealing lips which engage with the cover member.

7. A carrier as claimed in claim 1, wherein the applicator comprises a shank member carrying at at least one end thereof a brush for transferring cosmetic from a recess onto the skin of a user.

8. A carrier as claimed in claim 1, wherein one of the recesses is provided with an alternative form of applicator for transferring cosmetic from a recess onto the skin of a user.

9. A carrier as claimed in claim 1, wherein the applicator recess is provided with a mechanism for cleaning the operative terminal portion of the applicator as the applicator is withdrawn from the applicator recess.

10. A carrier as claimed in claim 1, wherein the body member is provided with one or more recesses in which a cosmetic can be mixed with another cosmetic or a fluid diluent.

11. A carrier as claimed in claim 1 made from moulded plastic components.

* * * * *